April 9, 1968  R. W. REPSHER  3,377,494
FLUORESCENT LAMP ENVELOPE WITH TRANSPARENT PROTECTIVE COATINGS
Filed May 24, 1965

WITNESSES
Theodore F. Wrobel
James F. Young

INVENTOR
Robert W. Repsher
BY W.D. Palmer
ATTORNEY

United States Patent Office 3,377,494
Patented Apr. 9, 1968

3,377,494
FLUORESCENT LAMP ENVELOPE WITH TRANSPARENT PROTECTIVE COATINGS
Robert W. Repsher, Kinnelon Township, Butler, N.J., assignor to Westinghouse Electric Corporation, Pittsburgh, Pa., a corporation of Pennsylvania
Filed May 24, 1965, Ser. No. 458,242
17 Claims. (Cl. 313—109)

ABSTRACT OF THE DISCLOSURE

For use with fluorescent lamps, a very thin, transparent, continuous and adherent coating of titanium dioxide or zirconium dioxode, which is modified by the addition of other selected metal oxides, is positioned intermediate the phosphor and the envelope interior surface to serve as a barrier or glass-protective layer and improve lamp performance. When applied to the exterior surface of the lamp envelope, the same coating provides lubricity to the lamp envelope in order to facilitate handling.

---

This invention relates to coatings for discharge device envelopes and, more particularly, to coatings which can be applied either to the envelope exterior surface, the interior surface, or both the exterior and interior surfaces of the glass envelopes for discharge devices in order to improve such devices.

Heretofore it has been known to apply to the inner surface of a fluorescent lamp envelope a coating consisting of a very finely divided refractory metal oxide, such as alumina, titania, or silica. Such coatings are disclosed in U.S. Patent 3,067,356, and they serve to prevent a mercury alkali amalgam formation on the inner surface of the lamp envelope. Since such coatings comprise a plurality of very minute particles, they must be relatively thick in order to prevent the discharge from contacting the glass envelope and thin in turn causes an excessive light loss. If such coatings are made sufficiently thin so that the light is not absorbed or scattered excessively, the discharge can contact a portion of the lamp envelope since the coatings are not continuous in nature but rather comprise a plurality of very finely divided particles.

In the manufacture of fluorescent lamps, it is desirable to apply a lubricity imparting coating to the exterior surface of the lamp envelope. Such coatings prevent fluorescent glass tubing from seizing when another tube is contacted during the manufacturing processes. In explanation, when two pieces of uncoated glass tubing are rubbed against one another, they will seize and chatter and this causes the coated phosphor to break loose from the envelope. The lubricity imparting coating prevents this seizing and such coatings are generally described in U.S. Patent 3,023,337. The coatings as described in this patent are phosphate coatings and while their performance is generally satisfactory, they are preferably applied after the drawn glass tubing has cooled somewhat since it is difficult to wet very hot tubing with water solutions of phosphate. In addition, the aforementioned phosphate coatings do not deposit as uniform coatings but rather comprise discrete depositions of phosphate. Also, while the formed phosphate coatings are relatively insoluble in water, they are not completely insoluble.

It is the general object of the present invention to provide an improved coating for either the exterior or the interior or both the exterior and interior surfaces of a discharge device envelope, which coating when applied to the inside surface of the lamp improves its performance and when applied to the outside surface of the lamp envelope imparts lubricity thereto.

It is another object to provide an improved coating for the interior surface of a fluorescent lamp envelope, which coating is completely transparent and improves the performance of the completed lamp.

It is a further object to provide a coating for the interior surface of a fluorescent lamp envelope, which coating is completely transparent and prevents any interaction of the mercury discharge with the glass comprising the envelope.

It is an additional object to provide an improved coating for the interior surface of a fluorescent lamp envelope, which coating permits less phosphor material to be used without impairing the lamp performance.

It is yet another object to provide a method for applying transparent, continuous coatings either to the interior surface, the exterior surface, or both the interior surface and the exterior surface of a fluorescent lamp envelope.

The foregoing objects of the invention, and other objects which will become apparent as the description proceeds, are achieved by providing an open-ended tubular glass member which is intended to comprise a fluorescent lamp envelope and wherein there is a thin, continuous and transparent layer comprising at least one material of the group consisting of titanium dioxide and zirconium dioxide adhered to and coated over a surface of the envelope. Preferably the applied coating has a thickness of from 0.02 to 0.2 micron and for best results, the titanium oxide coating is modified by the addition of aluminum, magnesium, barium, lead or zinc oxides. The zirconium oxide coating can be modified by the addition of magnesium, zinc or aluminum oxides. In order to apply the coated oxides in a very thin, transparent, continuous layer which is adherent to the glass, the titanium or zirconium oxides are applied as a metallic-organic compound, such as a titanate for example, which during or after application is convertible to the respective oxide.

For a better understanding of the invention, reference should be had to the accompanying drawings wherein.

Figure 1:
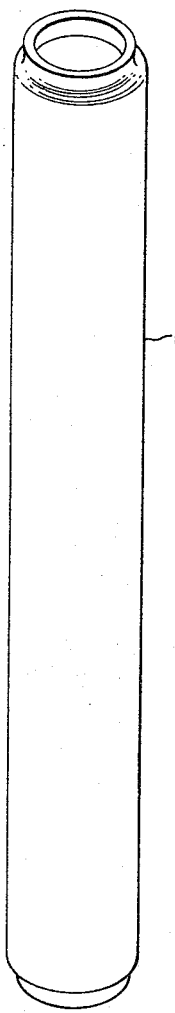
FIGURE 1 is a perspective view of an open-ended tubular glass member which is intended to comprise a fluorescent lamp envelope and which member carries the coatings of the present invention on either or both the exterior and interior surfaces thereof.
Figure 2:
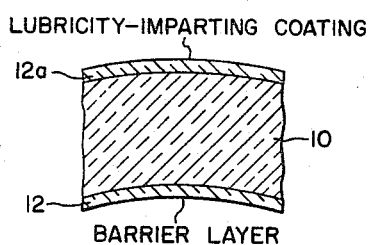
FIGURE 2 is an enlarged, fragmentary cross-sectional view of the glass member shown in FIG. 1.

With specific reference to the form of the invention illustrated in the drawings, the glass member 10, as shown in FIGS. 1 and 2, has a tubular configuration and is ready to be coated with phosphor material prior to fabrication into a lamp. In the embodiment as shown, the glass member 10 is coated with the coating 12 of the present invention on the interior surface thereof and a similar coating 12a is applied to the exterior surface thereof, although either the interior coating 12 and exterior coating 12a can be used alone, if desired. Since the coating of the present invention provides the beneficial effect when applied to both of the surfaces, no special precautions are necessary to limit the application of the coating to only one of the exterior and interior envelope surfaces.

Figure 3:
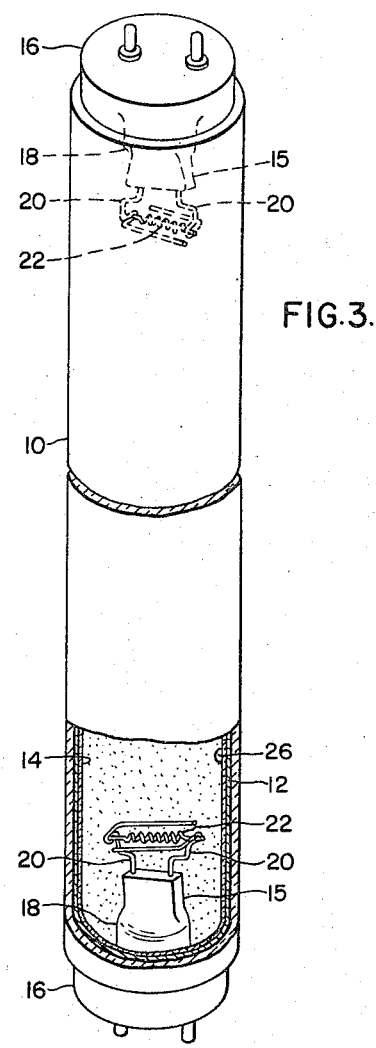
FIG. 3 is a perspective view of a completed fluorescent lamp which incorporates a barrier layer of the present invention between the inner surface of the envelope and the phosphor layer adherent thereover.

The completed lamp is shown in perspective view in FIG. 3 and briefly comprises the envelope 10, which can be formed of conventional soda-lime silica glass, having a thin barrier layer 12 of the present invention adhered directly onto the inner surface thereof and a phosphor layer 14 adhered over the barrier layer. Mounts 15 are sealed into either end of the envelope and base caps 16 facilitate lamp support and electrical connection. Each mount comprises a stem portion 18 supporting lead-in conductors 20 sealed therethrough and extending into the envelope 10. Coiled tungsten or other suitable refractory metal coils 22 carrying electron-emission material such as alkaline-earth oxides are supported proximate the ends of the envelope 10 and are carried between the inwardly extending extremities of the lead-in conductors 20. The phosphor coating 14 can comprise any conventional phosphor such as manganese-activated zinc silicate or calcium halophosphate which is activated by manganese and antimony. Also contained within the envelope 12 is a filling of inert ionizable starting gas, such as argon at a pressure of 4 mm., and a small charge of mercury 26.

The preferred coating of the present invention comprises titanium dioxide although zirconium dioxide or mixtures of titanium dioxide and zirconium dioxide may be used. These Group IV-B refractory metal oxides comprise the basic coating and they may be altered by the addition of other metallic oxides. In order that the titanium or zirconium dioxides will deposit as a very thin, transparent and continuous layer, it has been found necessary to deposit these materials onto the envelope as an organic-metallic compound which is convertible after application to the respective oxide. Any of the several available organic titanates may be used and the simplest to apply are the tetraisopropyl titanate and tetrabutyl titanate. When using either of these two materials dissolved in an appropriate solvent such as butyl alcohol or butyl acetate, the solvent evaporates upon application, leaving the titanate deposited upon the inner or outer surface of the envelope. Moisture from the air hydrolyzes the titanate as fast as the solvent evaporates forming titanium dioxide which remains and either isopropyl alcohol or butyl alcohol. The formed alcohol rapidly evaporates leaving the film of titanium dioxide. As a specific example for depositing the coatings under ambient temperature conditions and relative humidity of 20 to 35%, 20 grams of tetraisopropyl titanate are dissolved in 380 grams of butyl alcohol or butyl acetate. This solution is simply sprayed either onto the exterior surface of the lamp or the interior surface of the lamp envelope, or both, and there will be formed the thin, continuous film of titanium dioxide.

Titanium dioxide has a relatively high index of refraction and while the foregoing coatings are continuous, transparent and quite satisfactory, there is encountered some light loss at the interfaces between the air and the coated titanium dioxide as well as between the titanium dioxide and the glass substrate. An interference pattern may also be encountered if the titanium dioxide coating is relatively thick. In order to minimize this interface loss and possible interference pattern, it is desirable to add to the coated material a magnesium compound which is convertible after deposition to magnesium oxide. As a specific example, 10.7 grams of tetraisopropyl titanate and 16 grams of magnesium acetate, $Mg(C_2H_3O_2)_2 \cdot 4H_2O$, has added thereto sufficient butyl alcohol to form 400 cc. of solution. This solution is sprayed onto the lamp envelope and the resulting deposit converts to the oxide either immediately upon application or when the envelope is heated after the phosphor is applied. It has been found that the molar ratio of deposited titanium oxide to magnesium oxide should be from 3:1 to 1:6. The preferred molar ratio of titanium dioxide to magnesium oxide is 1:1. With a ratio greater than 3:1, interface light losses will be encountered and, in addition, there will be some tendency to form interference patterns. When the relative amount of magnesium oxide is sufficiently great that the molar ratio 1:6 is exceeded, adherence problems are encountered.

The thickness of the coating will normally vary from 0.02 micron to 0.2 micron, although this thickness may be exceeded slightly in some cases.

The present coatings can also be applied using a water vehicle provided the organic titanate compound is soluble in such vehicle. As a specific example, 16 grams of magnesium acetate and 22 grams of titanium lactate are dissolved in 378 cc. of distilled water. A small amount of a conventional wetting agent can be used, such as 1.0 gram of polypropylene glycol containing condensed ethylene oxide. This solution is sprayed onto the envelope and the water vehicle evaporated.

The titanium dioxide coating can also be modified by other metallic oxides such as those of lead, barium, zinc and aluminum, maintaining the relative molar ratios of titanium oxide to additive metal oxide within the range of from 3:1 to 1:6, as in the case of the preferred additive magnesium oxide. In the case of the lead additive, it can be added to the foregoing water vehicle coating solution as 2.3 grams of $Pb(NO_3)_2$, barium can be added as 5.0 grams of $Ba(C_2H_3O_2)_2$, zinc can be added as 11.0 grams of $Zn(NO_3)_2 \cdot 6H_2O$, and aluminum can be added at 11.0 grams of $Al(NO_3)_3 \cdot 9H_2O$.

As far as the additive metallic oxides such as magnesium oxide are concerned, these can be added as inorganic salts which are convertible, either upon application or on heating, to the indicated metallic oxides. For example, when a water vehicle is used, the magnesium compound can be added as magnesium nitrate which will convert, upon heating, to the indicated magnesium oxide. The water vehicle has the advantage of ease of handling and cost. Other titanium organic salts which are soluble in water can be used, such as titanium acetyl acetonate.

The coating comprising zirconium dioxide is applied in a similar manner. As an example, a 5% solution of tetroctyl or tetrabutyl zirconate in heptane or butanol is sprayed or flushed over the lamp surface desired to be coated. When the vehicle evaporates, the deposit hydrocoated. lyzes to form a thin, continuous film of zironium dioxide. The zironium dioxide can readily be modified by some of the foregoing indicated additive oxides such as magnesium, zinc, or aluminum oxides, maintaining the molar ratio of zirconium oxide to additive oxide within the range of from 3:1 to 1:6. As a specific example, the magnesium, zinc or aluminum compounds can be added to the 5% zirconate solution in the form of a 5% solution of the nitrates. Alternatively, the applied titanium oxides and zirconium oxides can be used in any proportions, adjusting the relative amounts of these compounds in the vehicle in accordance with the proportions desired in the coating.

While applied to the exterior surface of the fluorescent lamp envelope, for purposes of lubricity, the resulting coatings are quite insoluble and are very thin and transparent. When applied to the inside surface of a fluorescent lamp envelope, and the lamp is operated with a loading or wattage input of about 25 watts per foot of lamp length, the lumen output when measured after 3000 hours of operation is increased by more than 7%. This is attributed to the dual function of the titanium dioxide in acting to prevent the discharge from contacting the sodium in the glass envelope to form an alkali-containing amalgam and, in addition, the titanium dioxide is substantially opaque to ultraviolet radiations and this prevents the so-called solarization of the glass envelope which reduces the transparency of the glass. With the zirconium dioxide interior coating, the improvements are intermediate those realized with the lamps utilizing the interior titanium dioxide coating and the uncoated control lamps.

In the case of a standard 40 watt fluorescent lamp which operates with a loading or wattage input of 10 watts per foot of lamp length, the results are quite unusual in that the output of the lamp appears to be little affected, but the lamp can be operated with about 20% by weight of less phosphor material, in order to achieve the same performance. This represents a tremendous cost savings in phosphor material which is one of the more expensive components of the lamp. As a possible explanation of the reason why less phosphor can be used in conjunction with the coatings of the present invention, it is known that thinner phosphor coatings normally display a poorer maintenance of initial light output. By preventing solarization of the inner surface of the glass envelope, the present coatings permit thinner phosphor coatings, and thus less phosphor, to be used.

It will be recognized that the objects of the invention have been achieved by providing an improved coating for a discharge device, which coating can be applied either to the exterior surface of the lamp envelope, or the interior surface of the lamp envelope, or to both surfaces, in order to improve either the lamp manufacturing, or lamp performance, or both. The resulting applied coatings impart lubricity to the lamp when applied to the outer surface, and when applied to the inner surface the lamp performance is improved. There is also provided a method for applying these coatings wherein the resulting coating is very thin, continuous and is transparent.

As a possible alternative embodiment, the coating need only be applied to a longitudinal section of the lamp, as in the case of an aperture lamp as described in the aforementioned U.S. Patent No. 3,067,356. As another possible embodiment, when forming such an aperture lamp the present coating can be applied over the entire interior surface of the envelope and the phosphor need only be applied over a longitudinal section of the lamp envelope.

While best embodiments of the invention have been illustrated and described hereinbefore, it is to be particularly understood that the invention is not limited thereto or thereby.

I claim as my invention:

1. A fluorescent lamp comprising, a sealed elongated light-transmitting soda-lime-silica glass envelope enclosing electrodes operatively disposed proximate the ends thereof, said envelope also enclosing a charge of mercury and a predetermined amount of inert ionizable starting gas, a continuous and transparent barrier layer adhered to and coated over the inner surface of said envelope, and a phosphor layer coated over and adhered to said barrier layer, said barrier layer having a thickness of from 0.02 to 0.2 micron and consisting essentially of mixed titanium dioxide and magnesium oxide, and the molar ratio of titanium dioxide to magnesium oxide being from 3:1 to 1:6.

2. The lamp as specified in claim 1, wherein the molar ratio of titanium dioxide to magnesium oxide is about 1:1.

3. An open-ended tubular glass member which is intended to comprise a fluorescent lamp envelope, and a thin continuous and transparent layer adhered to and coated over at least one surface of said member, said layer consisting essentially of titanium dioxide plus at least one additional metal oxide of the group consisting of magnesium oxide, barium oxide, lead oxide and zinc oxide, the molar ratio of said titanium dioxide to said additional metal oxide being from 3:1 to 1:6, and the thickness of said layer being from 0.02 to 0.2 micron.

4. The open-ended member as specified in claim 3, wherein said glass member is formed of soda-lime-silica glass.

5. An open-ended tubular glass member which is intended to comprise a fluorescent lamp envelope, and a thin continuous and transparent layer adhered to and coated over at least one surface of said member, said layer consisting essentially of zirconium dioxide plus at least one additional metal oxide of the group consisting of magnesium oxide and zinc oxide, the molar ratio of said zirconium dioxide to said additional metal oxide being from 3:1 to 1:6, and the thickness of said layer being from 0.02 to 0.2 micron.

6. The open-ended tubular member as specified in claim 5, wherein said tubular member is formed of soda-lime-silica glass.

7. In combination with a fluorescent lamp comprising a sealed light-transmitting glass envelope having electrodes operatively disposed therein and enclosing a charge of mercury and a predetermined amount of inert ionizable starting gas, and a phosphor coating carried proximate the interior surface of said envelope, the improvement which comprises, a continuous and transparent barrier layer adhered to and coated over the interior surface of said envelope intermediate said envelope interior surface and said phosphor, said barrier layer consisting essentially of titanium dioxide plus at least one metal oxide of the group consisting of magnesium oxide, barium oxide, lead oxide and zinc oxide, and the molar ratio of said titanium dioxide to said additional metal oxide being from 3:1 to 1:6.

8. The lamp as specified in claim 7 wherein said barrier layer has the thickness of from 0.02 to 0.2 micron.

9. The lamp as specified in claim 8, wherein said glass envelope is formed of soda-lime-silica glass.

10. The lamp as specified in claim 9, wherein the molar ratio of said titanium dioxide to said additional metal oxide is about 1:1.

11. In combination with a fluorescent lamp comprising a sealed light-transmitting envelope having electrodes operatively disposed therein and enclosing a charge of mercury and a predetermined amount of inert ionizable starting gas, and a phosphor coating carried proximate the interior surface of said envelope, the improvement which comprises, a continuous and transparent barrier layer adhered to and coated over the interior surface of said envelope intermediate said envelope surface and said phosphor, said barrier layer consisting essentially of zirconium dioxide plus at least one metal oxide of the group consisting of magnesium oxide and zinc oxide, and the molar ratio of said zirconium dioxide to said additional metal oxide being from 3:1 to 1:6.

12. The lamp as specified in claim 11, wherein said barrier layer is a thickness from 0.02 to 0.2 micron.

13. The lamp as specified in claim 11, wherein said glass envelope is formed of soda-lime-silica glass.

14. The lamp as specified in claim 12, wherein the molar ratio of said zirconium dioxide to said additional metal oxide is about 1:1.

15. A fluorescent lamp comprising, a sealed light-transmitting glass envelope having electrodes operatively disposed therein, said envelope also enclosing a charge of mercury and a predetermined amount of inert ionizable starting gas, a phosphor layer coated over and adhered to at least a substantial portion of the inner surface of said envelope, and a thin continuous and transparent layer adhered to the exterior surface of said envelope, said layer formed of one Group IV–B metal oxide of the group consisting of titanium dioxide and zirconium dioxide plus at least one additional metal oxide, in the case of titanium dioxide said additional metal oxide is selected from one of the group consisting of magnesium oxide, barium oxide, lead oxide and zinc oxide, and in the case of zirconium dioxide said additional metal is selected from one of the group consisting of mangesium oxide and zinc oxide, and the molar ratio of said Group IV–B metal oxide to said additional metal oxide being from 3:1 to 1:6.

16. The lamp as specified in claim 15, wherein said layer has a thickness of from 0.02 micron to 0.2 micron.

17. The lamp as specified in claim 16, wherein said glass envelope is formed from soda-lime-silica glass.

References Cited

UNITED STATES PATENTS

| | | | |
|---|---|---|---|
| 2,244,558 | 6/1941 | Krautz | 313—109 |
| 2,768,909 | 10/1956 | Haslam | 117—33.3 X |
| 3,023,337 | 2/1962 | Repsher | 313—108 |
| 3,067,356 | 12/1962 | Ray | 313—109 X |
| 3,275,872 | 9/1966 | Chernin et al. | 313—108 X |

JAMES W. LAWRENCE, *Primary Examiner.*

DAVID J. GALVIN, *Examiner.*

P. C. DEMEO, *Assistant Examiner.*